United States Patent
Bates, Jr. et al.

(10) Patent No.: US 6,253,289 B1
(45) Date of Patent: Jun. 26, 2001

(54) MAXIMIZING SEQUENTIAL READ STREAMS WHILE MINIMIZING THE IMPACT ON CACHE AND OTHER APPLICATIONS

(75) Inventors: Kenneth Hoffman Bates, Jr.; Susan Gaye Elkington; James Perry Jackson; Clark Edward Lubbers; John Franklin Mertz; Bradford Scott Morgan, all of Colorado Springs, CO (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/087,034

(22) Filed: May 29, 1998

(51) Int. Cl.[7] .................................................. G06F 12/00
(52) U.S. Cl. ........................... 711/137; 711/118; 711/154; 712/207; 712/237
(58) Field of Search ..................................... 711/100, 112, 711/118, 137, 154, 160; 712/207, 237

(56) References Cited

U.S. PATENT DOCUMENTS

| | | | |
|---|---|---|---|
| 5,473,764 | * | 12/1995 | Chi ........................................ 712/207 |
| 5,544,342 | * | 8/1996 | Dean ..................................... 711/119 |
| 5,553,276 | * | 9/1996 | Dean ..................................... 713/500 |
| 5,623,615 | * | 4/1997 | Salem et al. .......................... 712/238 |
| 5,682,500 | * | 10/1997 | Vishlitzky et al. ................... 711/113 |
| 5,692,168 | * | 11/1997 | McMahan .............................. 712/237 |
| 5,758,076 | * | 5/1998 | Wu et al. .............................. 709/231 |
| 5,778,435 | * | 7/1998 | Berenbaum et al. ................. 711/137 |
| 5,996,071 | * | 11/1999 | White et al. .......................... 712/238 |
| 6,012,106 | * | 1/2000 | Schumann et al. .................... 710/22 |

* cited by examiner

Primary Examiner—Tuan V. Thai
(74) Attorney, Agent, or Firm—William J. Kubida; Kent A. Lembke; Hogan & Hartson LLP

(57) ABSTRACT

In a data storage system a number of records are prefetched from large volume storage devices for transfer to a cache in order to return requested records to a host computer in response to a read request from the host computer. If a previous prefetch is not complete when the read request is received, the number of records in a next prefetch of records is increased by a preset amount. If a previous prefetch is complete, a next prefetch of records is initiated with the same number of records in the prefetch as the previous prefetch. The initiation of prefetch operations is triggered by detection of a sequential read stream in a plurality of read requests from the host computer. When the prefetch size is increased, the preset amount of the increase equals the number of records in the read request from the host computer. After requested records are returned from the cache to the host computer in response to the read request, storage space in the cache used by the returned requested records is released.

10 Claims, 5 Drawing Sheets

|    |               | UNIT | LBA  | BC |                  |
|----|---------------|------|------|----|------------------|
| E1 | REQUEST       | 1,   | 210, | 3  |                  |
|    | READ & RETURN | 210 | 211 | 212 | |

E2 REQUEST 1, 213, 3    TRIGGER PREFETCH
   READ & RETURN  | 213 | 214 | 215 |
   PREFETCH       216-218

E3 REQUEST 1, 216, 3
   CACHE          | 216 | 217 | 218 |
   PREFETCH       219-221
   RETURN & REL.  | 216 | 217 | 218 |

E4 REQUEST 1, 219, 3
   CACHE          | 219 | 220 |
   PREFETCH       222-227
   WAIT FOR       | 219 | 220 | 221 |
   RETURN & REL.  | 219 | 220 | 221 |

E5 REQUEST 1, 222, 3
   CACHE          | 222 | 223 | 224 | 225 | 226 | 227 |
   PREFETCH       228-233
   RETURN & REL.  | 222 | 223 | 224 |

E6 REQUEST 1, 225, 3
   CACHE          | 225 | 226 | 227 |    | 228 | 229 | 230 | 231 | 232 |
   NO PREFETCH
   RETURN & REL.  | 225 | 226 | 227 |

*FIG. 2A*

| | | | | | | | | | |
|---|---|---|---|---|---|---|---|---|---|
| E7 | REQUEST | 1, | 228, | 3 | | | | | |
| | CACHE | 228 | 229 | 230 | 231 | 232 | 233 | | |
| | PREFETCH | 234-239 | | | | | | | |
| | RETURN & REL. | 228 | 229 | 230 | | | | | |
| E8 | REQUEST | 1, | 231, | 3 | | | | | |
| | CACHE | 231 | 232 | 233 | | 234 | 235 | | |
| | NO PREFETCH | | | | | | | | |
| | RETURN & REL. | 231 | 232 | 233 | | | | | |
| E9 | REQUEST | 1, | 234, | 3 | | | | | |
| | CACHE | 234 | 235 | 236 | 237 | 238 | | | |
| | PREFETCH | 240-248 | | | | | | | |
| | RETURN & REL. | 234 | 235 | 236 | | | | | |
| E10 | REQUEST | 1, | 237, | 3 | | | | | |
| | CACHE | 237 | 238 | 239 | | 240 | 241 | 242 | 243 |
| | NO PREFETCH | | | | | | | | |
| | RETURN & REL. | 237 | 238 | 239 | | | | | |
| E11 | REQUEST | 1, | 240, | 3 | | | | | |
| | CACHE | 240 | 241 | 242 | 243 | 244 | 245 | 246 | 247 | 248 |
| | PREFETCH | 249-257 | | | | | | | |
| | RETURN & REL. | 240 | 241 | 242 | | | | | |

*FIG. 2B*

MAXIMIZING SEQUENTIAL READ STREAMS WHILE MINIMIZING THE IMPACT ON CACHE AND OTHER APPLICATIONS

BACKGROUND OF THE INVENTION

1. Field of the Invention:

This invention relates to computing systems and to handling sequential read streams in the computing systems. More particularly, the invention relates to optimizing system performance during disk sequential read streams while minimizing the impact of such optimization on cache operations and other non-sequential read applications of the computing system.

2. Description of the Related Art:

In a computing system having cache memory and large volume storage devices, such as disk drives and tape drives, it is desirable to transfer information from a large volume storage device to cache memory. Relative to the speed of the computer processor, the time to access a record in a large volume storage device is very slow while the time to access a record in cache memory is quite fast. Where the application program being run by the computing system is using sequential records, the performance of the system is enhanced by prefetching records from a large volume storage drive such as a disk drive and loading these records in cache memory just prior to a request for the records from the processor. Then when the read record request is received from the processor, the record is rapidly read from cache.

The prefetching of records from a large volume storage device is known to have three problems. The first problem is determining under what conditions the system should perform a prefetch. Since prefetching is most effective when reading sequential records, the first problem is really how to determine that the system is reading sequential records. The second problem is determining the size of the record data block to be prefetched. Prefetching data from the disk drive loads down the disk drive relative to access to the drive by other applications. Therefore, the time spent in prefetching should be as small as possible, or in other words, how small can the number of prefetched data blocks be and still accomplish the prefetch goals. The third problem is how long should prefetched data remain in cache. If the cache is determining loaded with large volumes of prefetched sequential records, then random access records for other applications are squeezed out of cache memory.

SUMMARY OF THE INVENTION

In accordance with this invention, the above problems have been solved by initiating a prefetch of a number of records from the storage devices for transfer to the cache in order to return requested records to the host computer in response to a read request from the host computer. If a previous prefetch is not complete when the read request is received, the number of records in a next prefetch of records is increased by a preset amount. If a previous prefetch is complete, a next prefetch of records is initiated with the same number of records in the prefetch as the previous prefetch. The initiation of prefetch operations is triggered by detection of a sequential read stream in a plurality of read requests from the host computer. When the prefetch size is increased, the preset amount of the increase is the number of records in the read request from the host computer. After requested records are returned from the cache to the host computer in response to the read request, storage space in the cache for the returned requested records is released.

One great advantage and utility of the present invention is that prefetch operations are performed only when they are most effective i.e. for sequential read streams. Also, the prefetch size is controlled so that it tracks the need to respond to the host and does not increase out of control. Further, the cache memory space is preserved by releasing cache space after prefetch data for a sequential read has been passed from cache to host computer.

The foregoing and other features, utilities and advantages of the invention will be apparent from the following more particular description of a preferred embodiment of the invention as illustrated in the accompany drawings.

BRIEF DESCRIPTION OF DRAWINGS

FIG. 2, composed of FIGS. 2A and 2B, shows eleven events performed in accordance with a preferred embodiment of the invention.

DETAILED DESCRIPTION OF PREFERRED EMBODIMENTS

Figure 1:
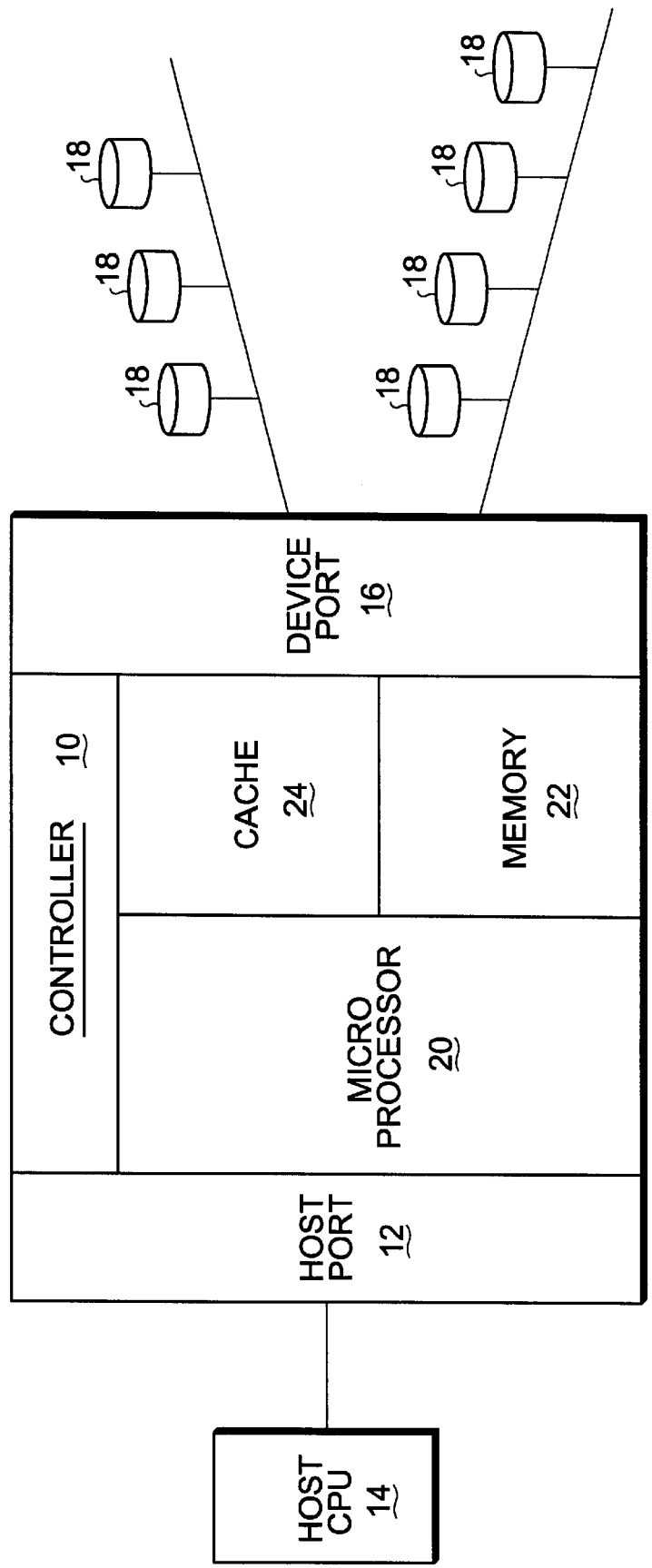
FIG. 1 illustrates a computing system with a storage controller to perform the logical operations of the invention.

The prefetch operations in the preferred embodiment of the invention are implemented in a storage system controller of a computing system. FIG. 1 illustrates such a storage system controller 10 having a host port 12 through which a host central processing unit 14 may be connected to the controller 10. Similarly, the controller 10 has a device port, or ports, 16 through which a plurality of large volume data storage devices, such as disk drives, CD-ROM drives and tape drives 18 are connected to the controller 10. The functions of the controller 10 are performed by microprocessor 20 working with its memory 22 and cache memory 24.

When host CPU 14 requests a record from the controller 10, microprocessor 20 will first check the cache 24 for the record. If the record is not in cache 24, then the record will be read from one of the large volume storage devices 18, stored in cache 24 and read, or returned, from cache 24 to host 14. The prefetch operations are first triggered when a sequential read stream is detected. Thereafter, a prefetch is initiated when a host is requesting blocks starting with the logical block address of the first block in a previous prefetch. The prefetch size is unchanged if the previous prefetch has been completed. The prefetch size is incremented if the previous prefetch has not been completed. The prefetch operations gradually increase the size of the prefetch by an increment corresponding to the record request size from the host 14. If the request size from the host is one block, the increment will be one block. If the request size from the host 14 is seven blocks, the increment will be seven blocks. The prefetch size is to be increased by increments sufficient to cause the prefetch operation to catch up with the host request operations but not increased so fast as to overwhelm the cache 24 with prefetch data. Further as a part of the embodiment of the prefetch operations, once a prefetch data block has been returned to the host 14 from cache 14, that space used by that data block in cache is released for another record data block to use.

FIG. 2 is an example of eleven events where there is sequential read stream of record blocks by host 14 and the controller 10 performs prefetch operations in accordance with the preferred embodiment of the invention. The flow of the logical operations to perform as depicted in the eleven events is described hereinafter with reference to FIG. 3.

In the sequential read stream example in FIG. 2, the read stream starts with a request from the host 14 for records in unit one of volume storage devices 18 starting at logical block address two hundred ten (210) and having a block count or length of three blocks. Since this is the first event, E1, in the sequential read, the record blocks will not be in cache 24 (FIG. 1) and must be read from unit one of the volume storage devices 18. Therefore in event E1, blocks 210, 211 and 212 are read from a large volume storage device 18 into cache 24 and then returned to host 14. Some time later, possibly after several other read requests have been processed, the second event E2 in the read stream occurs in FIG. 2. In event E2 the host 14 requests the next three blocks starting at unit 1, logical block address 213. As will be described hereinafter with reference to the flow of logical operations in FIG. 4, event E2 following event E1 will trigger a prefetch operation. The result in FIG. 2 is that blocks 213, 214 and 215 are read into the cache 24 from a large volume storage device 18 and passed back or returned to host 14, and the prefetch operations begin by initiating a prefetch of blocks 216, 217 and 218. These blocks are anticipated to be the blocks needed to satisfy the next request by the host 14 to this stream of records.

In FIG. 2, the third event E3 occurs sometime later and, as anticipated, is a request for blocks 216, 217 and 218. As depicted in FIG. 2, the assumption is that there is enough time lapse between event E2 and event E3 to complete a prefetch. Therefore, the prefetch of blocks 216, 217 and 218 has been completed, and these blocks are in cache 24. Also the request for three blocks starting at block 216 has arrived after the prefetch of blocks 216, 217 and 218 is complete, and therefore, the size of the prefetch (three blocks) is keeping up with the host request. The size of the next prefetch will not be changed and, during event E3, a prefetch is issued for the next additional three blocks 219–221 in the record stream. Event E3 completes by having the controller 10 return blocks 216, 217 and 218 to host 14 and releasing their space from cache memory. The space is released because at this point it is clear these records are sequential, and the host 14 is not likely in the short term to again request blocks 216, 217 and 218.

Sometime later, event, E4, occurs, and the host has requested three blocks starting at block 219. At the time this request is received, the prefetch of blocks 219, 220 and 221 has not been completed. The cache 24 has received so far only blocks 219 and 220. In accordance with the preferred embodiment of the invention, the prefetch size will then be increased by the size of the host request. Since the previous prefetch size is three blocks and the host request size is three blocks, the next prefetch size will be six blocks. Accordingly, the prefetch is now for blocks 222 through 227. Meanwhile, during event E4, the controller 10 waits for blocks 219, 220 and 221 from the previous prefetch to be loaded into cache 24 before returning these three blocks to host 14. When the three requested blocks 219, 220 and 221 are received in cache 24, the controller 10 returns these three blocks to host 14 and releases their space in cache 24.

In event E5, the host 14 has requested blocks 222, 223 and 224. As shown in FIG. 2, there has been enough time between event E4 and event E5 for the prefetch initiated during event E4 to complete. Therefore, the cache 24 during event E5 contains blocks 222 through 227. Since the prefetch operation is now keeping up with the host request, the prefetch size of six blocks is not changed, and the next prefetch is for blocks 228 through 233. The controller 10 returns blocks 222, 223, and 224 to the host 14 satisfying the E5 request and then releases that space in the cache 24.

During event E6, the host 14 requests three blocks starting at block 225. As shown for event E6, the cache 24 contains blocks 225, 226 and 227 and blocks 228 to 232 of the prefetch initiated in event E5. The prefetch from event E5 has not completed. The record request is for the second set of the three blocks from the six block prefetch initiated during event E4. Even though the prefetch from event E5 is not completed, no prefetch is initiated during event E6, because the requested blocks do not start at the first block of a prefetch. The requested blocks are the second portion of the prefetch from event E4. The requested three blocks 225, 226 and 227 are in cache 24, and controller 10 returns blocks 225, 226 and 227 to host 14 and releases this space in the cache 24.

In event E7, the host 14 request is for blocks 228, 229 and 230. The cache 24 contains blocks 228, 229, 230, 231, 232 and 233, and the prefetch initiated back in event E5 has been completed. Since the request is to the first logical block address of the prefetch, and the prefetch has been completed, the controller 10 does not increase the prefetch size; therefore, a prefetch for additional blocks 234 to 239 is initiated. The controller 10 also returns blocks 228, 229 and 230 to satisfy the event E7 request, and then the controller 10 releases that space from cache 24.

In the eighth event, E8, the request is for three blocks starting at logical block address 231. The timing between event E8 and event E7 is not sufficient for the prefetch event E7 to complete. Therefore, the cache 24 contains blocks 231, 232 and 233 from the prefetch initiated back in event E and contains blocks 234 and 235 from the prefetch initiated in event E7. Since block 231 is not the first logical block address of an earlier prefetch, no prefetch is initiated during event E8. Event E8 is completed when the controller 10 returns blocks 231, 232 and 233 from cache 24 to the host 14 and releases their space in cache 24.

During the ninth event, E9, the host 14 requests blocks 234, 235 and 236. At this time, the cache 24 contains blocks 234 through 238 and the prefetch initiated during the seventh event has not been completed. Since this is a request to the first logical block address of an earlier prefetch and since that prefetch has not completed, the prefetch size to be initiated during event E9 is increased. Again, the increment of increase is the size of the host 14 request which is three blocks. Since the previous prefetch size is six blocks and the host 14 request size is three blocks, the new prefetch size will be nine blocks. Thus, during the ninth event, a prefetch for blocks 240 through 248 is initiated. The ninth event is completed by the controller 10 returning blocks 234, 235 and 236 from cache 24 to the host 14 and releasing this space from the cache 24.

In the tenth event, E10, the host 14 requests three blocks starting at the logical block address 237. Event E10 is similar to event E8 in that the request is not to the first logical block of a earlier prefetch and the previous prefetch for blocks 240 to 248 have not been completed. Because the request is not to the first logical block of an earlier prefetch, no prefetch size increase occurs, and no prefetch is initiated during the tenth event. The tenth event completes by the controller 10 returning blocks 237, 238 and 239 from cache 24 to the host 14 and releasing this space in the cache 24.

In the eleventh event, E11, the host 14 requests three blocks starting at logical block address 240. In the cache 24, logical blocks 240 to 248 are present. Thus, the prefetch initiated in event E9 has been completed by the time the host 14 request the first logical block in that prefetch. Therefore, the prefetch size is unchanged and the next prefetch will be nine blocks, blocks 249 through 257. Event 11 completes by the controller 10 returning blocks 240, 241, and 242 to the host 14 and releasing their space in the cache 24.

Figure 3:
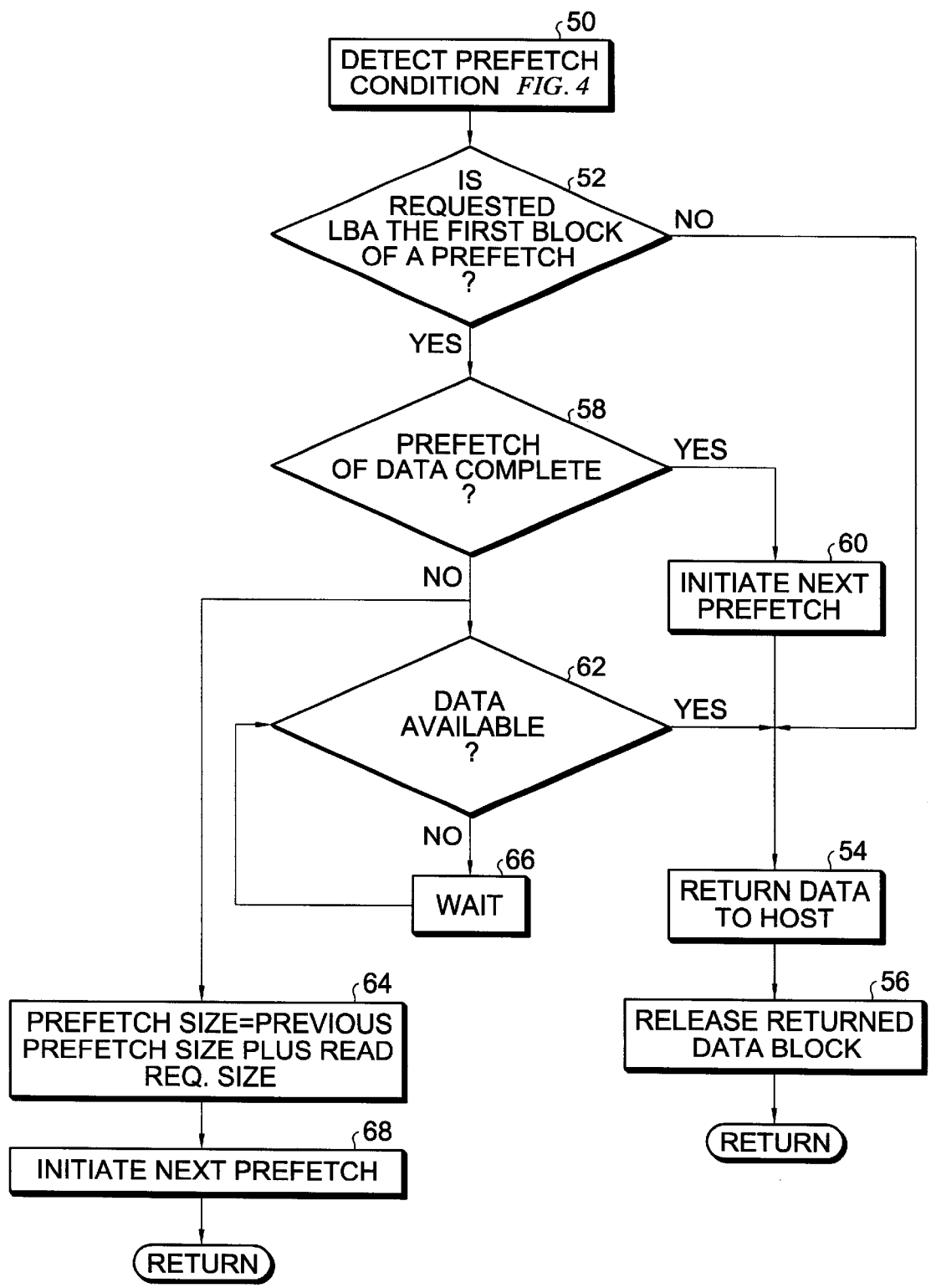
FIG. 3 shows the logical operations for prefetching records in accordance with a preferred embodiment of the invention.

The logical operation flow in the controller 10 to accomplish the data flow operations depicted in FIG. 2 are shown in FIG. 3. The logical operations of the preferred embodiment of the present invention are implemented (1) as a sequence of computer implemented steps running on the microprocessor in the controller 10 or (2) as interconnected logic circuit modules within the controller 10. The implementation is a matter of choice dependent on the performance requirements of the controller 10 implementing the invention. Accordingly, the logical operations making up the embodiments of the invention described herein are referred to variously as operations, steps or modules.

Figure 4:
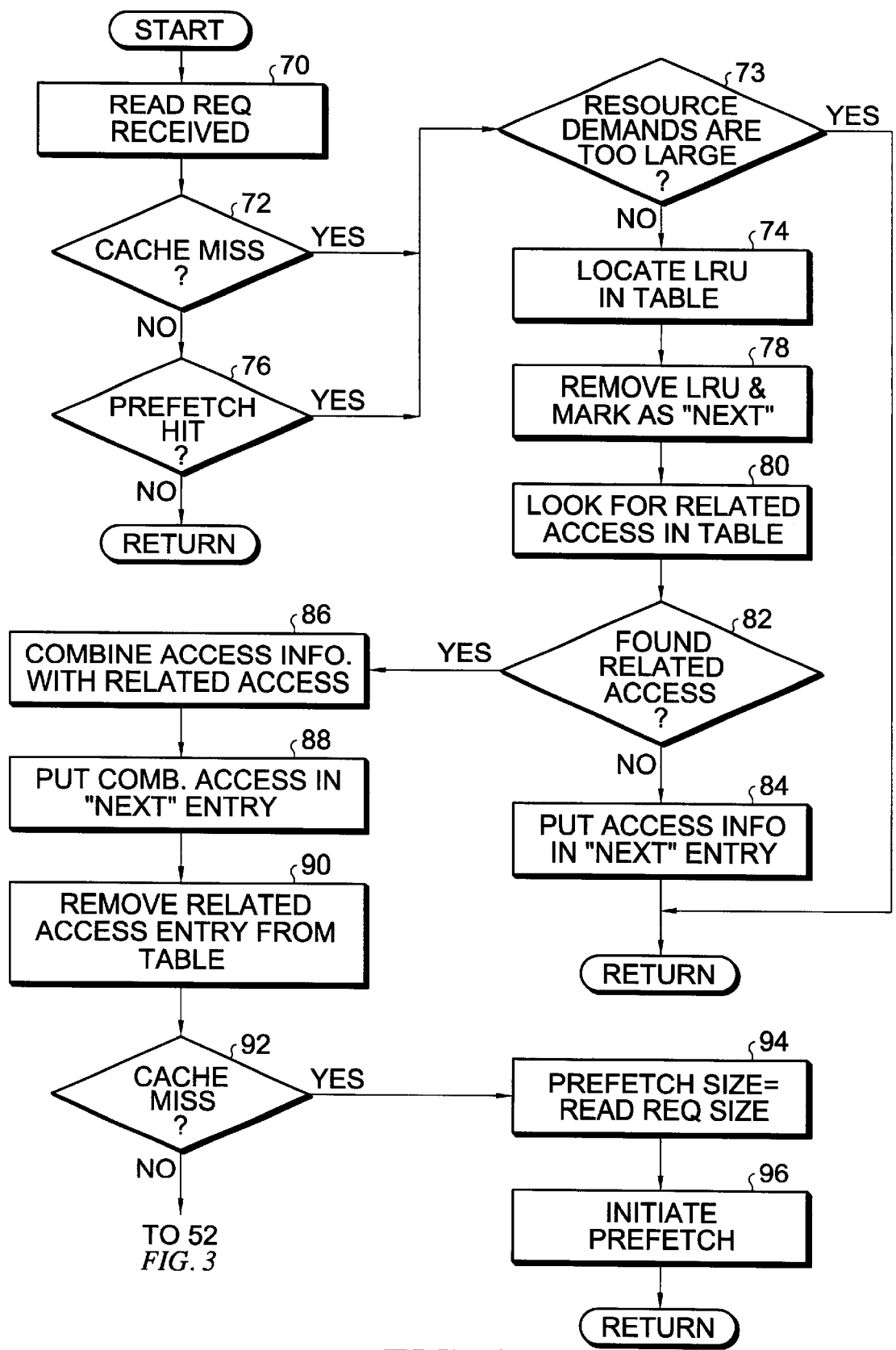
FIG. 4 shows the logical operations of a history module 50 in FIG. 3 for detecting a prefetch condition.

In FIG. 3, the prefetch operation flow begins at history module 50 which detects a prefetch condition. The logical operations of history module 50 for detecting a prefetch condition are shown in FIG. 4 and are described hereinafter. Decision operation 52 tests whether the requested logical block address in the request from the host 14 is the first block of an earlier prefetch. If the logical block address is not the first block of an earlier prefetch, then the flow branches NO to operation 54 to return the requested blocks from cache 24 to the host 14. Thereafter, operation 56 releases the space used by the requested blocks in cache 24 for use in subsequent storage of blocks in cache 24. In the example in FIG. 2, this corresponds to the situation depicted for events E6, E8 and E10.

If the logical block address of the host 14 request is for the first block of an earlier prefetch, then the flow branches YES to decision operation 58. Decision operation 58 is detecting whether the previous prefetch is complete. If the previous prefetch is complete, then operation 60 initiates the next prefetch and this next prefetch is the same size as the previous prefetch. After the prefetch is initiated, operation 54 returns the blocks of host 14 requested data from cache 24 to host 14. Operation 56 then releases these returned data blocks from cache 24 so that the space of these blocks is now available for use. In the example in FIG. 2, the path through operations 58, 60, 54 and 56 correspond to events E3, E5, E7 and E11.

If the previous prefetch of data blocks from high volume storage 18 to cache 24, is not complete, then operation flow in FIG. 3 branches NO from decision operation 58 to both decision operation 62 and prefetch size module 64. Operations 62 and 64 may proceed in parallel.

Decision operation 62 detects whether all of the blocks in the host 14 request are available in cache 24. If they are available, the operation flow branches YES to operation 54. The blocks requested by the host 14 are then returned from cache 24 to the host 14 at operation 54, and operation 56 releases this cache 24 space. If the blocks requested by the host 14 have not yet been read from the high volume storage 18 device to cache 24, then the flow branches NO from operation 52 to a wait step 66. Step 66 waits for an interrupt indicating record blocks have been read into cache 24 and then returns the flow to operation 62 to again test whether the requested blocks are in cache 24. When decision operation 62 detects that the requested blocks are present in cache 24, the flow branches YES to operations 54 and 56 described above. An example of this flow of operations in FIG. 2 is event E4.

In the parallel path from decision operation 58, the prefetch size module 54 adjusts the prefetch size. Branching NO from decision operation 58 indicates that the prefetch operations are not keeping up with host 14 requests because the data being retrieved in a previous prefetch has not been completely loaded into the cache 24. Therefore, prefetch size module 64 increases the prefetch size. The new prefetch size is equal to the previous prefetch size plus the size of the read request from the host 14. After the prefetch size is increased by module 64, operation 68 initiates the next prefetch. This completes the prefetch logical operations in FIG. 3. Examples of prefetch size adjustments in FIG. 2 are events E4 and E9.

FIG. 4 shows the logical operation for detecting a sequential read stream and thus the opportunity to perform prefetch operations shown in FIG. 3. In order to detect a sequential read stream, the logical operations of FIG. 4 must build a history table of recent I/O requests where there was a cache 24 miss, i.e., the I/O read request could not be satisfied from cache 24. This history table effectively provides a historical window for reviewing cache 24 misses to look for sequential read requests. By monitoring the contents of the history table for I/O read requests to sequential addresses, the logical operations in FIG. 4 detect sequential read streams and thus the prefetch condition.

The detection of sequential read streams begins in FIG. 4 at operation 70 which receives the read request. The read request contains within it the address for the read request which is the unit number, the logical block address and the block count. Operation 72 detects whether the requested blocks in the read request can be read from cache. If the request cannot be satisfied from cache, the request is a cache miss and the logical operation flow branches YES from decision 72 to decision operation 73. If the I/O request can be satisfied from cache, the logical operations branch NO from cache decision operation 72 to decision operation 76.

Decision operation 76 is detecting whether the read from cache involves prefetch data. If it does, the request is a prefetch hit. If the request is neither a cache miss or a prefetch hit, operation flow exits the logical operations of FIG. 4. If it is a prefetch hit, the operation 73 flow branches YES from decision operation 76 to decision operation 73. Decision operation is a check on whether the demands of the prefetch operation are too large and accordingly should not be initiated. For example, is the read request is too large (such as a megabyte) or if the system is starved for cache space, the prefetch operation is not initiated. If the demands on resources are too large, the flow branches YES and exits the logical operations for detecting a prefetch condition. If the demands are not too large, the operation flow proceeds to locate operation 74.

Locate operation 74 locates the least-recently used (LRU) entry in the history table. Operation 78 then removes the LRU entry and marks the entry as the "next" available location in the history table. Operations 74 and 78 thus are used to keep only recent information in the history table. The size of the history table is a matter of choice and depends upon factors such as the size of the cache in the controller 10, the number of volume storage 18 devices in the storage 18 system, and finally the likelihood of detecting a sequential stream after a certain number of read requests. For example, in a large storage 18 system with 90 disk drives and in a controller with a 128 megabyte cache, the likelihood of detecting a sequential read stream if none has occurred after 700 entries in a table is very low. Therefore, in the preferred embodiment for a large system, the history table can be safely limited to 1,000 entries.

Look operation 80 searches the history table for an access entry in the history table related to the address in the I/O request. In other words, the lookup operation 80 is searching for sequential addresses in recent I/O requests. In the example of FIG. 2, operation 80 would be looking at the event E2 address for the I/O request and would detect the event El I/O address as a related access previously entered in the history table. Detect operation 82 detects whether or not a related access was found during operation 80. If no related access was found, then the access information including the unit number, logical block address and block count, are put into the "next" entry in the history table created by operation 78. If detect operation 82 detects operation 80 has found a related access, then the logical flow branches YES to combine operation 86.

Combine operation 86 combines the access information in the I/O read request with the information in the related access. The additional information might include the presence or absence of a sequential stream, the data transfer size, write or read operation, host or hosts making the requests, presence of a read compare operation, etc. Operation 88 then puts the combined access information in the "next" entry made available by operation 78. To open space in the history table, operation 90 removes the related access entry from the history table. Since the related access information has already been used, it will not be needed further in looking for a related access.

Decision operation 92 tests whether operation flow from 86 through 88 have been performed for a cache miss. If the test indicates there is a cache miss, the related access that was found by look operation 80 and decision operation 82 was the initial detection of a sequential read stream. Therefore, the logical operations branch YES to set prefetch size operation 94. Set operation 94 sets the first prefetch size to the size of the read request. Operation 96 then initiates the first prefetch, and the operation flow exits to wait for the receipt of the next I/O request at operation 70. If the test indicates no cache miss, i.e. a prefetch hit, then operations 86 through 88 have updated the access entry in the history table to reflect the most recent prefetch hit. The logical operations branch NO from decision operation 92 to decision operation 52 in FIG. 3 to continue with the next prefetch.

While the invention has been particularly shown and described with reference to a preferred embodiment thereof, it will be understood by those skilled in the art that various other changes in the form and details may be made therein without departing from the spirit and scope of the invention.

What is claimed is:

1. Storage controller apparatus for controlling transfers of records in a record storage system between storage devices, a cache and a host computer, said apparatus comprising:

initiate module initiating a prefetch of a predetermined number of records from the storage devices for transfer to the cache in order to return requested records to the host computer in response to a read from the host computer;

test module, responsive to the read request, detecting if the requested records are in cache and therefore a previous prefetch is complete;

prefetch size module, responsive to a detection by said test module that the previous prefetch of data is not complete, increasing the number of records in the next prefetch of records by a preset amount and thereafter enabling said initiate module to initiate a next prefetch of records; and said initiate module, responsive to a detection by said detection module that the previous prefetch of data is complete, initiating a next prefetch of records with the number of records in the prefetch being the same as in the previous prefetch;

a history module detecting a sequential read stream in a plurality of read requests from the host computer and enabling said initiate module to initiate a prefetch;

a detecting module detecting whether the current read request is a cache miss or a prefetch hit;

set module responsive to detection of said cache miss by said detecting module for setting the prefetch size to the size of the read request; and said test module, responsive to the detection of said prefetch hit by said detecting module, being enabled to detect if the previous prefetch is complete.

2. The apparatus of claim 1 wherein the preset amount in the increase in the number of records in the next prefetch is the number of records in the read request from the host computer.

3. The apparatus of claim 1 and in addition: return module returning requested records from the cache to the host computer in response to the read request when the requested records are available from the cache; and release module releasing storage space in the cache used by the requested records after the requested records have been returned to the host computer.

4. The apparatus of claim 1 wherein:

said initiate module is not enabled to initiate a prefetch if a requested record for the current read request is not a first record in a previous prefetch.

5. The apparatus of claim 1 wherein said history module further comprises a history table storing record addresses for recent read requests in access entries in the table;

a finding module looking for a related access entry in the table based on the record address in the current read request being sequential to the address in the related access entry; and enabling said initiate module to initiate a prefetch if the related access entry is found by said finding module.

6. A method for controlling transfer of records in a record storage system between storage devices, a cache and a host computer, said method comprising the steps of:

initiating a prefetch of a number of records from the storage devices for transfer to the cache in order to return requested records to the host computer in response to a read request from the host computer;

detecting if a previous prefetch is complete;

if said previous prefetch is not complete, increasing the number of records in a next prefetch of records by a preset amount and initiating the next prefetch of records; and if said previous prefetch is complete, initiating a next prefetch of records with the number of records in the prefetch being the same as in the previous prefetch;

sequentially detecting a sequential read stream in a plurality of read requests from the host computer and enabling a prefetch by said initiating step;

storing record addresses for recent read requests in access entries in a history table;

searching for a related access entry in the history table based on the record address in the current read request; and if a related access entry is found in the history table by said searching step, enabling another prefetch by said initiating step.

7. The method of claim 6 wherein the preset amount in the increase in the number of records in the next prefetch is the number of records in the read request from the host computer.

8. The method of claim 6 further comprising the step of:

returning requested records from the cache to the host 14 computer in response to the read request when the requested records are available from the cache; and releasing storage space in the cache of each requested record after the requested record has been returned to the host computer.

9. The method of claim 6 wherein said initiating step does not initiate a prefetch if a requested record for the current read request is not a first record in a previous prefetch.

10. The apparatus of claim 6 wherein said sequence detecting step further comprising the steps of:

looking for previous read requests with record addresses sequential to the address in a current read request; and initiating a first prefetch if said looking step finds sequential record addresses and if the current read request was a cache miss.

* * * * *

UNITED STATES PATENT AND TRADEMARK OFFICE
CERTIFICATE OF CORRECTION

PATENT NO. : 6,253,289 B1 Page 1 of 1
DATED : June 26, 2001
INVENTOR(S) : Kenneth Hoffman Bates, Susan Gaye Elkington, James Perry Jackson, Clark Edward Lubbers, John Franklin Mertz, and Bradford Scott Morgan It is certified that error appears in the above-identified patent and that said Letters Patent is hereby corrected as shown below:

<u>Claim 8,</u>
Line 14, after host please delete "14"

Signed and Sealed this

Twelfth Day of March, 2002

*Attest:*

*Attesting Officer*

JAMES E. ROGAN
*Director of the United States Patent and Trademark Office*